(No Model.)

J. S. SMITH.
PNEUMATIC TIRE.

No. 505,255. Patented Sept. 19, 1893.

Witnesses.

Inventor
John S. Smith

UNITED STATES PATENT OFFICE.

JOHN SAMUEL SMITH, OF LONDON, ENGLAND.

PNEUMATIC TIRE.

SPECIFICATION forming part of Letters Patent No. 505,255, dated September 19, 1893.

Application filed January 24, 1893. Serial No. 459,527. (No model.)

*To all whom it may concern:*

Be it known that I, JOHN SAMUEL SMITH, a subject of the Queen of Great Britain, residing at London, England, have invented new and useful Improvements in or Connected with Pneumatic Tires, of which the following is a specification.

My invention relates to pneumatic tires of the kind which is secured to the wheel by drawing the edges of the cover or jacket over or securing the said edges to the inner periphery of the rim.

The object of my invention is to provide means for bracing the two sides of the cover or jacket together against the outer periphery of the rim without at the same time putting any obstacle in the way of the ready removal of the air-chamber.

In carrying out my invention I form inside the cover or jacket two flaps which, when the jacket is in position upon the rim with the air-chamber within it, occupy a position between the said air-chamber and the rim. The necessary resistance to lateral movement is advantageously afforded to these flaps by introducing into a pocket along the edge of each a band of elastic material which serves to draw the said edges into the hollow of the rim and by the pressure exerted by the air-chamber which when expanded serves to press the said flaps firmly between itself and the rim.

To enable my invention to be fully understood, I will describe the same by reference to the accompanying drawings, in which—

Figure 1:
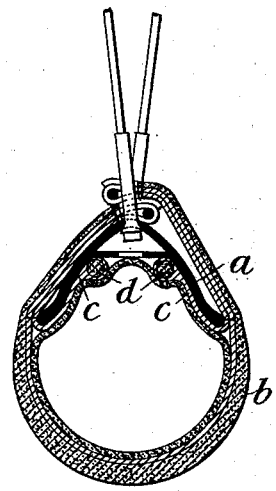
Figure 2:
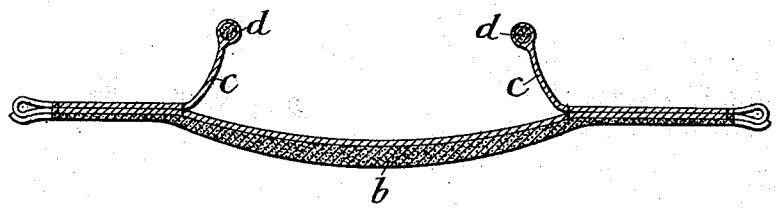

Figure 1 is a transverse sectional view of a pneumatic tire provided with my bracing flaps; and Fig. 2 is a sectional view of the cover having flaps, the said cover being detached from the rim.

Similar letters of reference indicate corresponding parts in the several figures.

*a* is the rim of the wheel, *b* the jacket of the tire, and *c, c* are the bracing flaps. These flaps *c, c* are formed of canvas or other material firmly connected to the inner side of the jacket and have in their free edges bands *d, d* of india-rubber or other elastic material designed when the tire is upon the wheel to draw the flaps down to the bottom of the groove in the rim. When the tire is upon the wheel and the air-chamber is inflated the pressure of such air-chamber presses the said flaps into close contact with the rim of the wheel, as shown in Fig. 1, and thus produces a certain amount of friction which when augmented by the inward pull due to the construction of the bands *d, d* upon the bottom of the rim serves to prevent the tire from bulging at that part immediately adjacent to the rim and so obviates friction upon the air-chamber.

In the drawings the tire is represented as being secured to the rim by means of wires in the manner described in the specification filed with my application of even date with this application but it is to be understood that my improved bracing flaps may be used in connection with other forms of tire adapted to be fastened over the inner periphery of the rim.

In order to remove the air-chamber from the rim it is only necessary to disconnect one edge of the covering and then to draw the bracing flap on one side of the jacket out of the groove in the rim, this being readily accomplished owing to the elasticity of the band *d*. When the tire is repaired and again introduced into the covering, the band serves by springing into the bottom of the groove to draw the flap into its proper position. I also sometimes find it advantageous to cement or otherwise attach one bracing flap to the wheel; in which case it is obviously unnecessary to introduce a cord or band into the flap for tightening it upon the wheel.

Having now particularly described and ascertained the nature of my said invention and in what manner the same is to be performed, I declare that what I claim is—

1. In a pneumatic tire the combination with the rim, and the air chamber, of the tire jacket having flaps for engaging the exterior of the rim, and bracing flaps for engaging the interior of the rim, an elastic cord engaging one of said bracing flaps for securing it in position in respect to the rim, and means for holding the other bracing flap in engagement with the rim, substantially as described.

2. In a pneumatic tire the combination with the concave rim and air chamber, of the tire jacket having flaps for engaging the exterior of the rim, and laterally extending bracing flaps for engaging the concave interior of the rim and lying between the rim and air chamber, and an elastic cord secured to the edge of each bracing flap for drawing the same into the concave rim and holding it, substantially as described.

3. In a pneumatic tire the combination with the concave rim and air chamber, of the tire jacket, provided with flaps for engaging the exterior of the rim and bracing flaps for engaging the concave interior of the rim between the rim and the air chamber said bracing flaps having their edges provided with cords, for holding said edges in said concave rim, whereby the inflation of the air chamber causes it to engage said bracing flaps and press said corded edges into close engagement with the rim, substantially as described.

JOHN SAMUEL SMITH.

Witnesses:
G. F. REDFERN,
JOHN E. BOUSFIELD,
*Of the firm of G. F. Redfern & Co., 4 South Street, Finsbury, London, Patent Agents.*